United States Patent
Ye et al.

(10) Patent No.: US 9,736,067 B2
(45) Date of Patent: Aug. 15, 2017

(54) PREFIX-AWARE WEIGHTED COST MULTI-PATH GROUP REDUCTION

(71) Applicant: Google Inc., Mountani View, CA (US)

(72) Inventors: Fei Ye, Mountain View, CA (US); Jiangbo Li, Sunnyvale, CA (US); Victor Lin, Fremont, CA (US); Subhasree Mandal, San Jose, CA (US)

(73) Assignee: Google Inc., Mountain View, CA (US)

( * ) Notice: Subject to any disclaimer, the term of this patent is extended or adjusted under 35 U.S.C. 154(b) by 108 days.

(21) Appl. No.: 14/643,712

(22) Filed: Mar. 10, 2015

(65) Prior Publication Data
US 2015/0326476 A1    Nov. 12, 2015

Related U.S. Application Data

(60) Provisional application No. 61/991,969, filed on May 12, 2014.

(51) Int. Cl.
*H04L 12/707* (2013.01)
*H04L 12/741* (2013.01)
(Continued)

(52) U.S. Cl.
CPC ............ *H04L 45/54* (2013.01); *H04L 45/123* (2013.01); *H04L 45/24* (2013.01); *H04L 45/42* (2013.01);
(Continued)

(58) Field of Classification Search
CPC ... H04L 45/54; H04L 45/7453; H04L 45/123; H04L 45/42; H04L 45/24; H04L 45/745; H04L 47/12; H04L 47/17
(Continued)

(56) References Cited

U.S. PATENT DOCUMENTS 6,594,261 B1 * 7/2003 Boura ................ H04L 41/0654
                                                      370/217
7,366,100 B2 * 4/2008 Anderson .............. H04L 45/02
                                                      370/237
(Continued)

OTHER PUBLICATIONS

International Search Report and Written Opinion mailed Jul. 2, 2015 in PCT Application No. PCT/US2015/024217.
(Continued)

Primary Examiner — Edan Orgad
Assistant Examiner — Ivan O Latorre
(74) Attorney, Agent, or Firm — McDermott Will & Emery LLP

(57) ABSTRACT

Methods and systems for generating a forwarding table for a packet switch. The system includes a route manager for the packet switch, configured to identify a plurality of multi-path groups each corresponding to a respective initial set of routing entries in the forwarding table and generate, for one or more multi-path groups, at least one replacement set of routing entries with fewer routing entries than the initial set corresponding to the respective multi-path group. The route manager selects, based on a traffic reduction cost metric, one or more of the replacement sets of routing entries, each corresponding to a different respective multi-path group, and updates the forwarding table with the selected replacement sets. In some implementations, the traffic reduction cost metric includes a traffic characteristic. In some implementations, the packet switch participates in a software-defined network (SDN) and the route manager is part of an SDN controller.

20 Claims, 7 Drawing Sheets

(51) Int. Cl.
*H04L 12/801* (2013.01)
*H04L 12/743* (2013.01)
*H04L 12/721* (2013.01)
*H04L 12/717* (2013.01)

(52) U.S. Cl.
CPC ........ *H04L 45/745* (2013.01); *H04L 45/7453* (2013.01); *H04L 47/12* (2013.01); *H04L 47/17* (2013.01)

(58) Field of Classification Search
USPC .......................................................... 370/238
See application file for complete search history.

(56) References Cited

U.S. PATENT DOCUMENTS

| | | | | |
|---|---|---|---|---|
| 7,453,883 | B1* | 11/2008 | Lynch | H04L 45/00 370/389 |
| 7,898,959 | B1 | 3/2011 | Arad | |
| 8,014,278 | B1* | 9/2011 | Subramanian | H04L 12/2867 370/229 |
| 8,160,063 | B2* | 4/2012 | Maltz | H04L 45/02 370/254 |
| 2006/0101157 | A1* | 5/2006 | Eardley | H04L 45/00 709/239 |
| 2006/0133282 | A1* | 6/2006 | Ramasamy | H04L 45/00 370/238 |
| 2007/0147255 | A1* | 6/2007 | Oyman | H04L 45/12 370/238 |
| 2008/0095160 | A1* | 4/2008 | Yadav | H04L 12/1886 370/390 |
| 2009/0185491 | A1* | 7/2009 | Schollmeier | H04L 45/12 370/238 |
| 2010/0149988 | A1* | 6/2010 | Matsubara | H04L 45/38 370/237 |
| 2010/0208744 | A1 | 8/2010 | Shaikh et al. | |
| 2011/0164527 | A1* | 7/2011 | Mishra | H04L 45/123 370/252 |
| 2012/0203825 | A1* | 8/2012 | Choudhary | H04L 65/4076 709/203 |
| 2012/0314581 | A1* | 12/2012 | Rajamanickam | H04L 41/0826 370/238 |
| 2013/0286846 | A1* | 10/2013 | Atlas | H04L 45/34 370/236 |
| 2013/0339544 | A1 | 12/2013 | Mithyantha | |
| 2014/0071837 | A1 | 3/2014 | Werb et al. | |
| 2014/0241356 | A1* | 8/2014 | Zhang | H04L 45/38 370/392 |
| 2014/0269305 | A1* | 9/2014 | Nguyen | H04L 45/28 370/235 |
| 2015/0163146 | A1* | 6/2015 | Zhang | H04L 47/125 370/238 |
| 2015/0256460 | A1* | 9/2015 | Mosko | H04L 45/748 370/392 |
| 2015/0271061 | A1* | 9/2015 | Byun | H04L 47/125 370/392 |
| 2015/0312134 | A1* | 10/2015 | Kapadia | H04L 12/44 370/256 |
| 2016/0112299 | A1* | 4/2016 | Li | H04L 12/6418 370/255 |
| 2016/0205071 | A1* | 7/2016 | Cooper | H04L 12/6418 726/1 |

OTHER PUBLICATIONS

Zhou, Junlan, et al. WCMP: Weighted Cost Multipathing for Improved Fairness in Data Centers, EuroSys 2014, ACM, Apr. 14, 2014.

Zhao, X., Liu, Y., Wang, L., & Zhang, B. On the Aggregatability of Router Forwarding Tables. In INFOCOM, 2010 Proceedings IEEE, pp. 1-9, IEEE (Mar. 2010).

* cited by examiner

Simplified Forwarding Table 310

| 312 | 316 | 318 |
|---|---|---|
| 1321 | Pattern A | Path A |
| 1322 | Pattern B | Path B |
| ... | ... | ... |

Figure 3A

Multi-Path Forwarding Table 330

| 332 | 336 | 338 | |
|---|---|---|---|
| 1341 | Pattern A | Path A | |
| 1342 | Pattern A | Path B | 342 |
| 1343 | Pattern A | Path C | |
| 1344 | Pattern B | Path D | 344 |
| 1345 | Pattern B | Path E | |
| 1346 | Pattern C | Path F | 348 |
| ... | ... | ... | |

Figure 3B

| | 352 | 356 | 358 | |
|---|---|---|---|---|
| | \| | | | |
| | 1362 | Pattern A | Path A | |
| | 1363 | Pattern A | Path A | 364 |
| | 1364 | Pattern A | Path A | |
| | 1365 | Pattern A | Path B | |
| 362 | 1366 | Pattern A | Path B | 366 |
| | 1367 | Pattern A | Path B | |
| | 1368 | Pattern A | Path C | 368 |
| | 1369 | Pattern A | Path C | |
| 374 | 1370 | Pattern B | Path D | |
| | 1371 | Pattern B | Path E | |
| 376 | 1372 | Pattern C | Path F | |
| | ... | ... | ... | |

Multi-Path Forwarding Table 350

Figure 3C

PREFIX-AWARE WEIGHTED COST MULTI-PATH GROUP REDUCTION

CROSS-REFERENCE TO RELATED APPLICATIONS

This application claims the benefit of U.S. Provisional Application No. 61/991,969, titled "Prefix-Aware Weighted Cost Multi-Path Group Reduction," filed May 12, 2014, hereby incorporated by reference in its entirety.

BACKGROUND

Information is transmitted between computer systems in the form of network packets passed from network device to network device, e.g., switches, in one or more interconnected networks. Each network device forwards received packets toward a destination specified by header information in the packets. The destination address may be for a device in a different network, which may be controlled by a third-party, and the packets may pass through any number of distinct networks in between the source and destination.

Some network devices, typically a switch, include memory allocated to a forwarding table. When the network device receives a packet, the network device can use the information in the forwarding table to determine how to handle the received packet. For example, the forwarding table may include a routing entry specifying an egress port connected to a next-hop along a path to a network destination.

In some network configurations, there may be multiple viable paths from a network device to a particular network destination. Equal-Cost Multi-Path (ECMP) routing allows for a forwarding table to include routing entries for each of the multiple paths. A switch supporting ECMP can then distribute network traffic across the multiple routes in an ECMP route set. Weighted-Cost Multi-Path (WCMP) routing enables some of the multiple viable paths in a multi-path route set to be used more than other paths in the same set. However, routing entries for a WCMP route set can consume a significant portion of the memory allocated to the forwarding table.

SUMMARY

In one aspect, the disclosure relates to a method of generating a forwarding table for a packet switch. The method includes identifying, in a forwarding table of a packet switch, a plurality of multi-path groups each corresponding to a respective initial set of routing entries in the forwarding table. The method includes generating, for one or more multi-path groups in the plurality of multi-path groups, at least one replacement set of routing entries with fewer routing entries than the initial set of routing entries corresponding to the respective multi-path group. The method includes selecting, based on a traffic reduction cost metric, one or more of the replacement sets of routing entries, each selected replacement set corresponding to a different respective multi-path group in the plurality of multi-path groups, and replacing, in the forwarding table of the packet switch, the initial set of routing entries for each multi-path group corresponding to a selected replacement set of routing entries, with the respective corresponding selected replacement set of routing entries. In some implementations, the traffic reduction cost metric includes a first traffic characteristic.

In another aspect, the disclosure relates to a system. The system includes a packet switch with a forwarding table, and a route manager for the packet switch. The route manager is configured to identify, in the forwarding table, a plurality of multi-path groups each corresponding to a respective initial set of routing entries in the forwarding table and generate, for one or more multi-path groups in the plurality of multi-path groups, at least one replacement set of routing entries with fewer routing entries than the initial set of routing entries corresponding to the respective multi-path group. The route manager is configured to select, based on a traffic reduction cost metric, one or more of the replacement sets of routing entries, each selected replacement set corresponding to a different respective multi-path group in the plurality of multi-path groups, and replace, in the forwarding table, the initial set of routing entries for each multi-path group corresponding to a selected replacement set of routing entries, with the respective corresponding selected replacement set of routing entries. In some implementations, the traffic reduction cost metric includes a first traffic characteristic. In some implementations, the packet switch participates in a software-defined network (SDN) and the route manager is part of an SDN controller for the packet switch.

BRIEF DESCRIPTION OF THE DRAWINGS

The above and related objects, features, and advantages of the present disclosure will be more fully understood by reference to the following detailed description, when taken in conjunction with the following figures, wherein:

FIG. 3A-3C are block diagrams of example forwarding tables.

Like reference numbers and designations in the various drawings indicate like elements.

DETAILED DESCRIPTION

Figure 1:
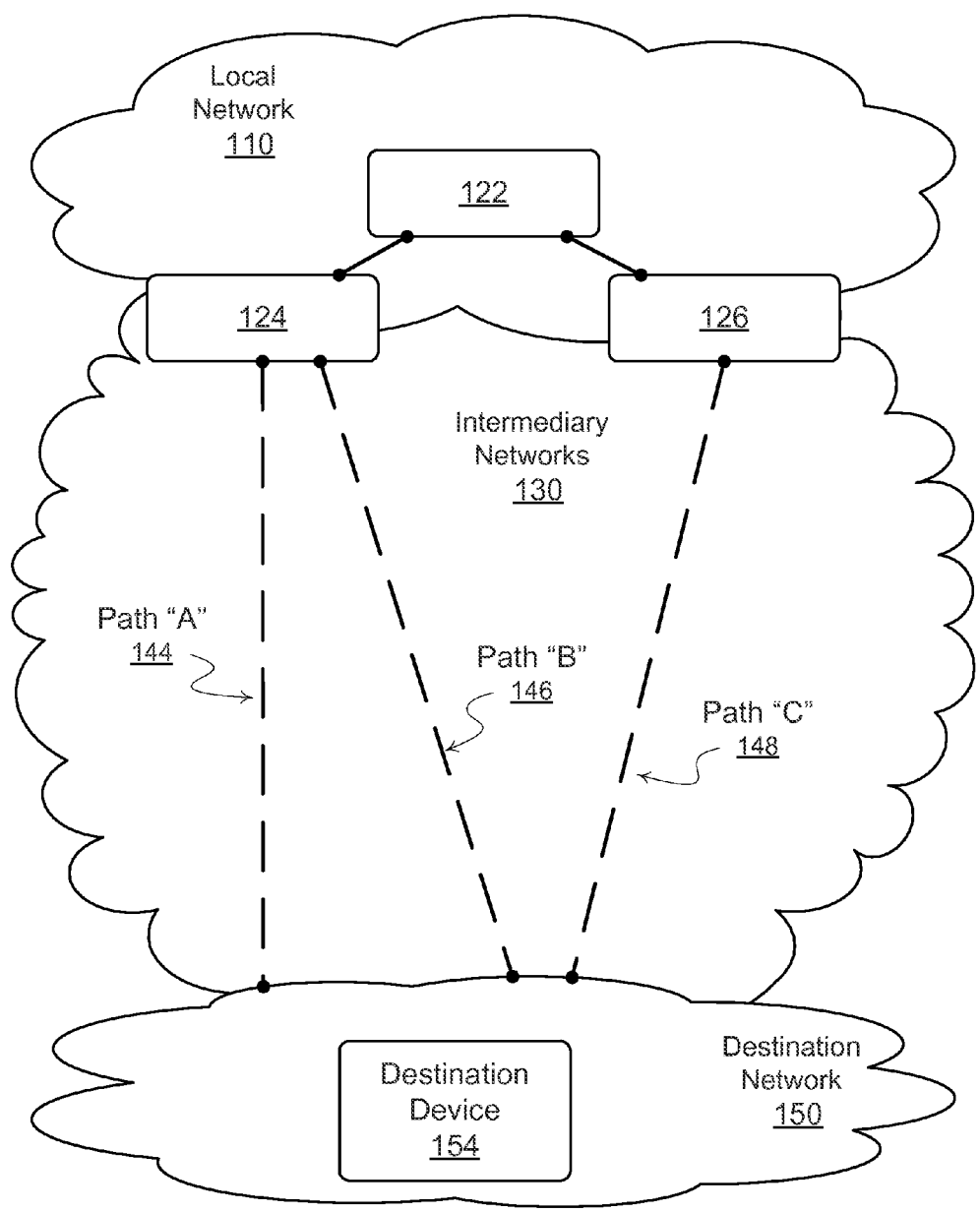
FIG. 1 is a block diagram of an example network.

FIG. 1 is a block diagram of an example network environment made up of multiple independent networks linked together at various interconnect points. As illustrated, a local network 110 is in communication with a destination network 150 via one or more intermediary networks 130. The local network 110 connects to the intermediary networks 130 through network devices 124 and 126 at the edge of the local network 110. These "edge" network devices participate in three illustrated network paths through the intermediary networks 130: Path "A" 144, Path "B" 146, and Path "C" 148. Each path 144, 146, and 148, is a different route through the networks 110, 130, and 150 to a destination device 154 in the destination network 150. A network device 122 in the local network 110 can forward a packet addressed to the destination device 154 to either edge device 124 or 126 and have the packet reach the destination network 150. That is, the network device 122 can implement multi-path routing.

Figure 2:
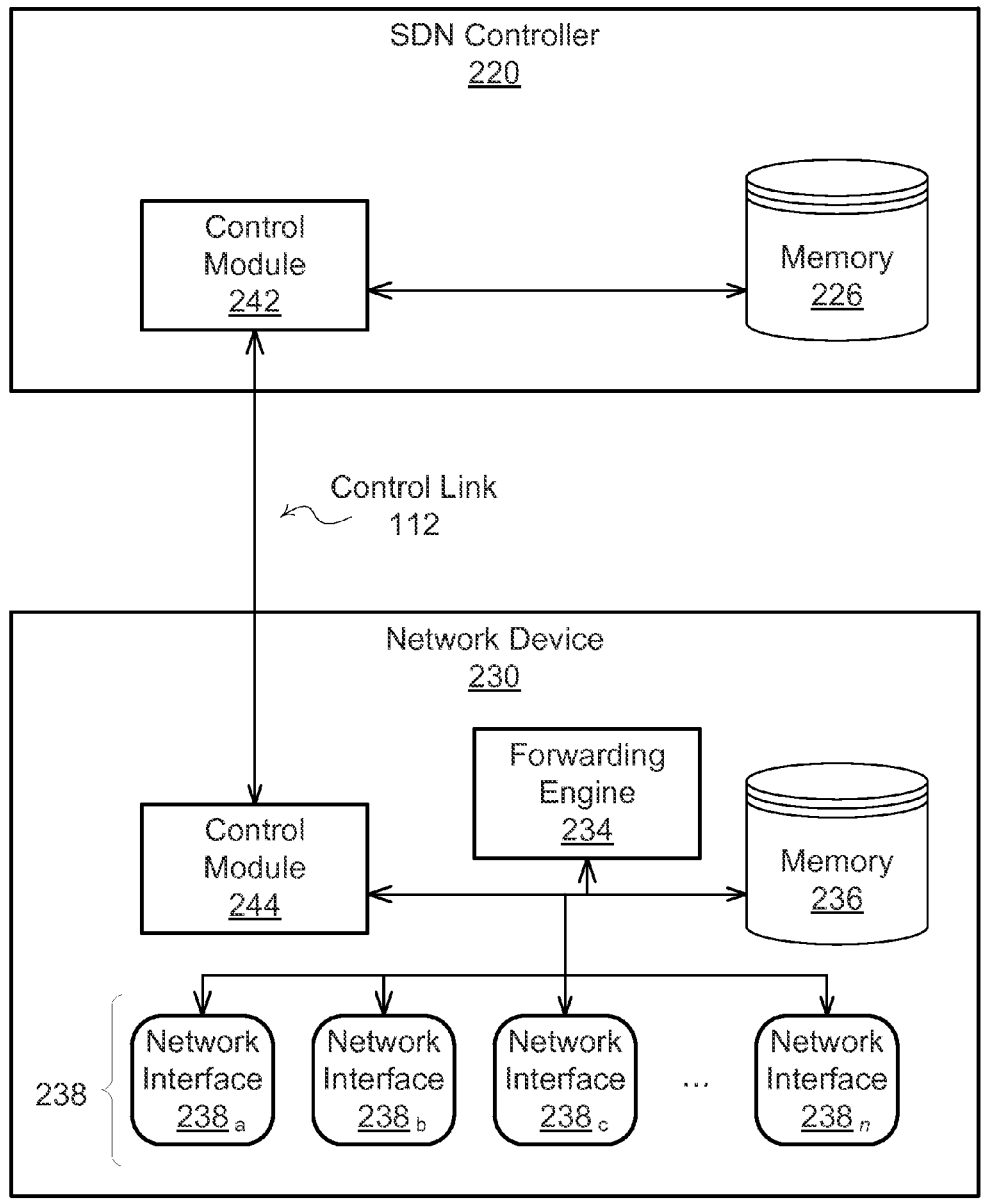
FIG. 2 is a block diagram of an example network device.

Referring to FIG. 1, in more detail, the local network 110 includes various network devices 122, 124, and 126. The local network 110 can be any kind of data network facilitating communication between multiple computing systems. A network device 122 within the local network 110 can send (transmit) and receive packets to and from other network devices within the local network 110, including network devices 124 and 126 at the edge of the local network 110. In some implementations, the local network 110 is a software-defined network (SDN), wherein one or more of the network devices are controlled by an SDN controller (not shown in FIG. 1). An example of a network device controlled by an SDN controller is illustrated in FIG. 2. An example of a computing system that can be used to implement a network device is illustrated in FIG. 7.

Referring still to FIG. 1, the edge network devices 124 and 126 connect the local network 110 to other networks 130. In some implementations, an edge device has a network interface connected to one network, and another network interface connected to another network, such that the "multi-homed" device can participate in both networks. In some implementations, an edge device is connected to an edge device of another network via a network interconnect, e.g., an interconnect provided by a third-party Internet Exchange Provider (IXP). The edge devices 124 and 126 act as gateways between the local network 110 and other network 130. In some implementations, the edge devices 124 and 126 implement routing protocols such as the Border Gateway Protocol (BGP). For a packet to travel from within the local network 110 to a destination device 154 external to the local network 110, the packet is routed within the local network 110 to an edge device along a network path to the destination network 150 hosting the destination device 154. An edge network device 124 is illustrated as participating in at least two distinct paths, path "A" 144 and path "B" 146, through the intermediary networks 130 to the destination network 150. Another edge network device 126 is illustrated as participating in a third distinct path, path "C" 148, through the intermediary networks 130 to the destination network 150. That is, there are at least three different paths from the local network 110 to the destination network 150.

The intermediary networks 130 are data networks facilitating communication between multiple computing systems. In some implementations, an intermediary network 130 is controlled by the same party that controls the local network 110, e.g., within an autonomous system. In some implementations, an intermediary network 130 is controlled by a third-party. In some implementations, an intermediary network 130 is a carrier network. In some implementations, a packet transmitted from the local network 110 to a destination network 150 will pass through multiple intermediary networks 130.

The destination device 154 is a computing system, or network device, that can receive network packets. The destination device 154 is associated with at least one network address, placing it within the network address space of the destination network 150. The destination device 154 may be any computing system capable of receiving packets from a network. For example, the destination device 154 can be a client device configured to present information received from the destination network 150 to a computer user. In some implementations, the destination device 154 is a server. For example, the destination device 154 can be an off-site data storage system. An example of a computing system that can be used to implement a destination device 154 is illustrated in FIG. 7.

The destination network 150 can be any kind of data network facilitating communication between multiple computing systems. In some implementations, the destination network 150 is an Internet service provider (ISP) network.

The local network 110, the intermediary networks 130, and the destination network 150, can each be any kind of data network facilitating communication between multiple computing systems. For example, each network 110, 130, and/or 150, can be a local area network (LAN), a wide area network (WAN), or a virtual network. Each network has OSI physical layer properties and operates using OSI link layer protocols, e.g., Ethernet. Each network can include additional network devices not shown in FIG. 1, e.g., hubs, bridges, switches, or routers. Any of the networks 110, 130, and/or 150, can be a software-defined network (SDN).

In some implementations, all of the network devices 122, 124, 126, and 154, instead of being located in different networks, may be included in the same network. For example the devices may all be in the same software defined data center network. Some data center networks include large numbers of servers arranged in racks, each including one or more top-of-rack switches. The servers then communicate with other servers in the data center through one or more layers of aggregation layer switches. In such a network, as an example, a top-of-rack switch in a data center may be linked to multiple aggregation layer switches and configured to employ multi-path routing to distribute the traffic output by the servers included in its rack across multiple switches in a given aggregation layer of the network. Similarly, the aggregation layer switches may also employ multi-path routing.

FIG. 2 is a block diagram of an example software-defined network controller 220 and network device 230 separated by a control link 112. In broad overview, the SDN controller 220 includes a control module 242 and memory 226, e.g., for storing network configuration and routing data. The network device 230 includes a control module 244 and memory 236, e.g., for storing device configuration and routing data. The network device 230 includes a forwarding engine 234 that uses the device configuration and routing data stored in memory 236 to manage data traffic at network interfaces 238. The network device 230 is suitable for use as any of the network devices 122, 124, and 126 illustrated in FIG. 1.

Referring to FIG. 2, in more detail, the SDN controller 220 includes a control module 242 and memory 226. The control module 242 uses network configuration and routing data stored in the memory 246 to configure the network device 230. In some implementations, the control module 242 periodically sends a status or availability message to the network device 230. In some implementations, the SDN controller 220 generates forwarding tables, and publishes the forwarding tables to one or more network devices 230.

The network device 230 includes a control module 244 and memory 236. The network device control module 244 receives configuration and routing information from the SDN controller control module 242 (via the control link 112) and updates the data stored in memory 236.

The network device 230 includes a set of network interfaces 238. Each network interface 238 may be connected to a data network. For example, the network device 230 may receive data packets for the network via a first network interface (e.g., network interface $238_a$). The network device 230 forwards the received data packets to an appropriate next-hop via another interface (e.g., network interface $238_b$). In some implementations, the forwarding engine 234 determines which network interface 238 to use for each data packet received. In some implementations, the forwarding engine 234 uses a forwarding table stored in memory 236 to determine which network interface 238 to use.

The forwarding engine 234 uses configuration and routing data in memory 236 to manage the data traffic at the network interface ports 238. The configuration and routing data in memory 236 are controlled by the SDN controller 220 via the control module 244. In some implementations, the forwarding engine 234 updates packet headers before forwarding packets to an egress network interface port 238. For example, the forwarding engine 234 may update explicit congestion notification (ECN), hop-count (TTL), or checksum information in packet headers.

The memory 226 and the memory 236 may each be any device suitable for storing computer readable data. Examples include, but are not limited to, semiconductor memory devices such as EPROM, EEPROM, SRAM, and flash memory devices. In some implementations, the memory 236 is ternary content-addressable memory (TCAM). In some implementations, the memory 236 of a network device 230 includes memory dedicated to buffering packet flows as they traverse the network device 230. A network device 230 may have any number of memory devices 236. An SDN controller 220 may have any number of memory devices 246.

FIGS. 3A, 3B, and 3C are examples of forwarding tables that can be used by a network device to identify an egress port for a packet.

FIG. 3A illustrates a simplified forwarding table 310. Each routing entry in the table 310 indicates a match pattern 316 and a forwarding instruction 318. The match pattern 316, e.g., "Pattern A," is satisfied by packets that should be handled using the corresponding forwarding instruction 318, e.g., "forward along Path A." In some instances, the match pattern 316 matches all packets directed towards a particular network or autonomous system. For example, the match pattern 316 can match part of a packet's destination address and the corresponding forwarding instruction 318 can identify an egress port from the network device to a next-hop network device along a network path towards all network addresses matching the pattern 316. In some instances, the match pattern 316 only matches to packets from a specific flow. Each routing entry in the forwarding table 310 is illustrated with an index 312 uniquely identifying the routing entry. In some implementations, the forwarding table does not have a specific index 312.

FIG. 3B illustrates a multi-path routing table 330 with indices 332, match patterns 336, and forwarding instructions 338. The multi-path routing table 330 includes a multi-path set 342 of routing entries with the same pattern 336, "Pattern A," but distinct forwarding instructions 338: Forward, respectively, along "Path A," "Path B," and "Path C." An additional multi-path set 344 and non-multi-path routing entry 348 are also shown. The same forwarding table 330 may be used for both multi-path routing entries and single-path routing entries.

Equal-cost multi-path (ECMP) routing generally treats paths to a destination as equivalent. A network switch can forward traffic through any of the multiple equivalent paths to reach the same destination. In some implementations of ECMP, if there are multiple routing entries in the forwarding table 330 for the same destination, then the network device distributes traffic to the destination across the multiple paths. There are several ways in which the traffic can be distributed. For example, the network device can simply iterate through the routing entries, so that each packet takes a different path. In some implementations, each new flow passing through the network device is assigned to a particular path. This approach distributes different flows across the different path options while transmitting the different packets of a single flow along the same path. In some such implementations, a portion of the header information for each packet is hashed and the least significant bits of the hash result are used to identify a routing entry for the packet, e.g., by index 332. The portions of the header information are selected such that packets of the same flow will generate the same hash value. For example, in some implementations, header bits representing a destination address and protocol type are hashed. The multi-path forwarding table 330 illustrated in FIG. 3B includes a multi-path set 344 with two paths for a match pattern 336 of "Pattern B." As a simplified example of distributing flows over the paths in the set 344, packet headers for flows matched by Pattern B can be hashed. In this example, if the hash value is even, the routing entry with index "1344" for Pattern B is used to transmit packets along Path D, and if the hash value is odd, the routing entry with index "1345" for Pattern B is used to transmit packets along Path E.

It is also possible to favor some routing paths over others by using weighted-cost multi-path (WCMP) routing. One way to implement WCMP is to enter additional routing entries into a multi-path set with the same path. For example, Path D might have twice the bandwidth capacity as Path E, and should therefore be used twice as much. The multi-path set 344 could be expanded with an additional entry (not shown) that repeats the match pattern 336 and forwarding instruction 338 for Path D (entry index "1344"). Network traffic is then distributed across the three routing entries, resulting in twice as much traffic using Path D as compared to Path E. This weighted-cost multi-path set can represented as "{Dx 2, Ex 1}" or simply "{2, 1}". However, expanded representation of multi-path sets in a forwarding table can consume a significant portion of the memory allocated to the forwarding table.

FIG. 3C illustrates multi-path routing table 350 with weighted routing entries. The multi-path routing table 350 is shown with indices 352, match patterns 356, and forwarding instructions 358. The multi-path routing table 350 includes a multi-path set 362 of routing entries with the same pattern 356, "Pattern A," but three possible forwarding instructions 358: Forward, respectively, along "Path A" for a subset 364, "Path B" for a subset 366, and "Path C" for a subset 368. An additional multi-path set 374 and non-multi-path routing entry 376 are also shown; these correspond, respectively, to sets 344 and 348 shown in FIG. 3B. Referring still to FIG. 3C, the same forwarding table 350 may be used for both multi-path routing entries and single-path routing entries.

FIGS. 3B and 3C demonstrate that minor changes in path-weighting can have a dramatic influence on the forwarding table. The multi-path set 342 in FIG. 3B corresponds to three paths, A, B, and C, (e.g., referring to FIG. 1, the three paths 144, 146, and 148). Each of the paths has a weight 1/3=0.333, such that they are all equal. The multi-path set 362 in FIG. 3C corresponds to the same three paths, A, B, and C, but with a slightly reduced weight for the third path, path C. The change will cause Path C to handle one-third less traffic than either of Path A or Path B. In the multi-path forwarding table 350 shown in FIG. 3C, there are three routing entries 364 for Path A, and three routing entries 366 for Path B, but only two routing entries 368 for Path C. That is, Path A and Path B have weights of 3/8=0.375, while Path C has a weight of 2/8=0.250. However, the multi-path set 362 uses eight entries {3, 3, 2} in the multi-path table 350, whereas the multi-path set 342 only used three entries {1, 1, 1} in the multi-path table 330.

Figure 4:
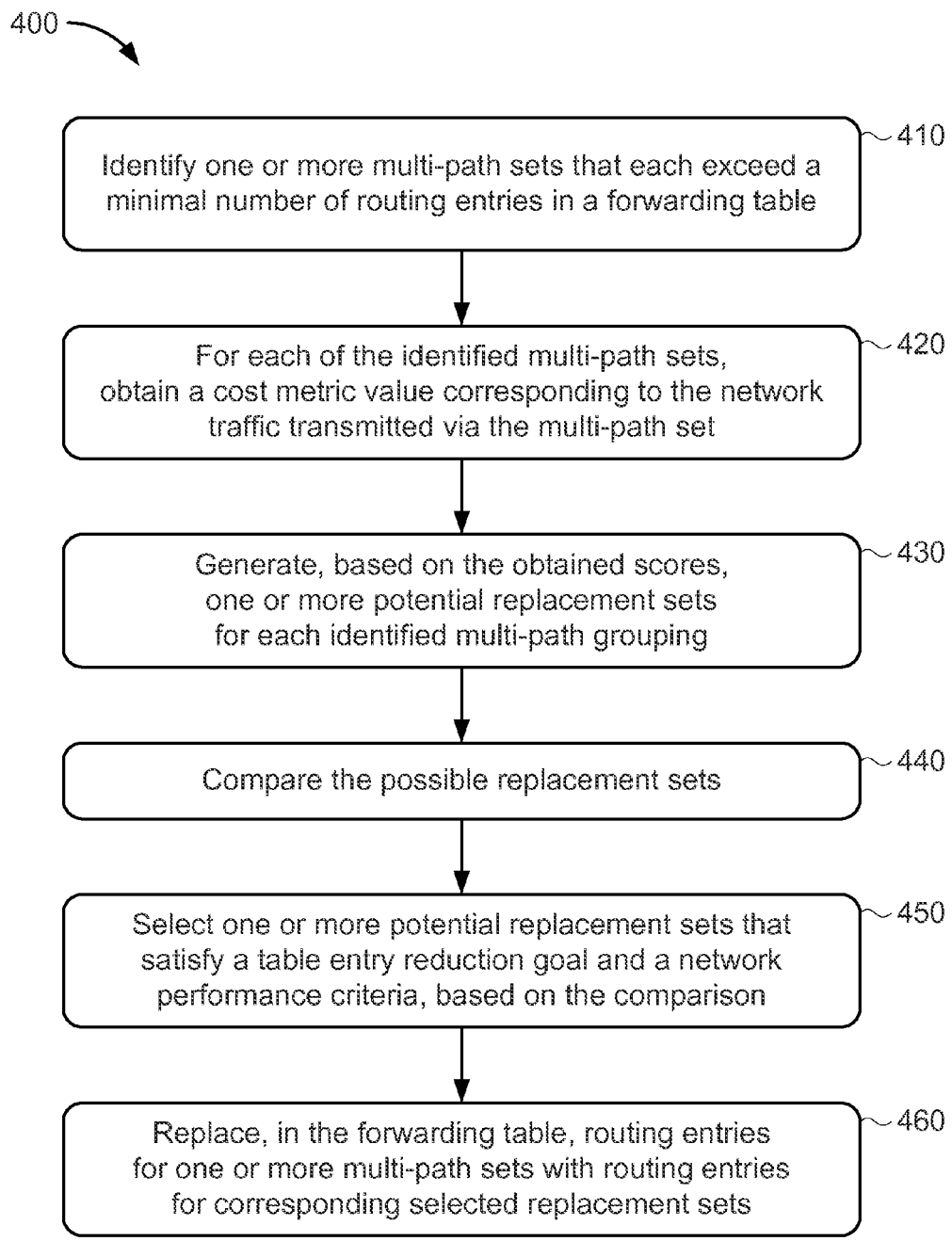
FIG. 4 is a flowchart for a method of prefix-aware WCMP group reduction.

FIG. 4 is a flowchart for a method 400 of prefix-aware WCMP group reduction. The method 400 begins with a route manager identifying one or more multi-path sets that each exceed a minimal number of routing entries in a forwarding table, e.g., sets that have three or more routing entries (stage 410). For each of the identified multi-path sets, the route manager obtains a score corresponding to an importance of network traffic transmitted via the multi-path set (stage 420). The route manager then generates, based on the obtained scores, one or more potential replacement sets for each identified multi-path set (stage 430). The route manager compares the possible replacement sets (stage 440) and selects one or more potential replacement sets that satisfy a table entry reduction goal and a network performance criteria (stage 450). The route manager then replaces, in the forwarding table, the routing entries for one or more multi-path sets with routing entries for corresponding selected replacement sets (460). Referring to FIG. 2, in some implementations, the route manager is, or is included as part of, an SDN controller 220.

Referring to FIG. 4, in more detail, the method 400 begins with a route manager identifying one or more multi-path sets that each exceed a minimal number of routing entries in a forwarding table (stage 410). For example, if the minimal number of routing entries is five, than only sets of six or more entries will be targeted for reduction. If the minimal number of routing entries is two, then only sets of three or more entries will be targeted for reduction. The route manager identifies multi-path sets in a forwarding table with an objective of reducing the number of entries in the table used by the identified multi-path sets. In some implementations, the method 400 is performed at periodic intervals. In some implementations, the method 400 is performed when the forwarding table is saturated with more than a threshold number of entries. In some implementations, the method 400 is initiated by an administrator.

For each of the identified multi-path sets, the route manager obtains a score corresponding to an importance of network traffic transmitted via the multi-path set (stage 420). In some implementations, this score is part of a traffic reduction cost metric. In some implementations, the route manager maintains a score (an "importance score") based on the types of packets transmitted. In some implementations, flows using specific protocols are considered more important than other flows. For example, in some implementations, network transmissions using a stateful transport-layer protocol are considered more important than transmissions using stateless transport-layer protocols. Examples of a stateful transport-layer protocol include, but are not limited to, are the Transmission Control Protocol (TCP), the Datagram Congestion Control Protocol (DCCP), and the Stream Control Transmission Protocol (SCTP). An example of a stateless transport-layer protocol is the User Datagram Protocol (UDP). In some implementations, a flow exceeding a sizing limitation is considered more important than other network transmissions. In some implementations, the source and/or destination network address (or network address prefix) is used to identify if network traffic is important. In some implementations, network packets addressed to a particular network address, or network address range, are considered more important (or less important) than other network transmissions. In some implementations, the importance score is a running score measuring the importance of the network traffic transmitted during a period of time. In some implementations, the amount of data transmitted via a multi-path set influences the importance score. In some implementations, the importance score is a Boolean value indicating important or not important. In some implementations, the importance score is a numeric value.

The route manager then generates, based on the obtained scores, one or more potential replacement sets for each identified multi-path set (stage 430). In some implementations, if a multi-path set has a comparatively low importance score, or if the score indicates that the multi-path set is not important, the route manager uses the method 500 illustrated in FIG. 5 to select a minimal set of diverse routing entries for the unimportant multi-path set. In some implementations, for a weighted-cost multi-path (WCMP) set, a potential replacement set is generated by converting the WCMP set to an equal-cost multi-path (ECMP) set. For example, a WCMP set of {4, 4, 2, 1} may be flattened to {1, 1, 1, 1}. In some implementations, for a WCMP set, one or more lower-weighted paths are removed from the set. For example, a WCMP set of {4, 4, 2, 1} may be converted to {4, 4, 2}, which is resolved to {2, 2, 1 }. This may be repeated, e.g., further reducing {2, 2, 1} to {1, 1}. In some implementations, the WCMP set is both modified by removing one or more paths and by flattening the remaining paths into an ECMP set, where each path in the set is only represented once. For example, a WCMP set of {4, 4, 2, 1} may be reduced to {1, 1, 1}.

The route manager compares the possible replacement sets (stage 440) and selects one or more potential replacement sets that satisfy a table entry reduction goal and a network performance criteria (stage 450). Each potential replacement set, if used in place of a corresponding multi-path set, will reduce the number of forwarding table entries used. Each potential replacement set, if used in place of a corresponding multi-path set, will also provide network traffic using the multi-path set with reduced network performance. For example, if a path is removed from a multi-path set, traffic will lose access to the bandwidth contributed by the removed path. This loss may be offset by other factors. The potential change in network performance is measured as a traffic reduction cost metric.

In some implementations, the potential change in network performance is weighted by the importance score obtained in stage 420. That is, it may be more acceptable for low-importance or medium-importance traffic to suffer a particular change in network performance, and less acceptable for high-importance traffic to suffer the same particular change in network performance.

The comparisons at stage 440 may include one or more of: comparing at least two different replacement sets of routing entries corresponding to the same multi-path group; comparing replacement sets of routing entries corresponding to at least two different multi-path groups; and comparing at least two aggregations of multiple replacement sets of routing entries each corresponding to multiple multi-path groups.

In some implementations, the route manager compares the possibilities and selects (stage 450) one or more of the potential replacement sets such that at least a target number of forwarding table routing entries are freed-up with an acceptably low impact on network performance. In some implementations, the route manager uses a combination of replacements across multiple multi-path sets in order to reach the table reduction goal. In some implementations, the route manager calculates the possible bandwidth loss that may result from using one or more of the potential replacements sets, and uses the results of these calculations in determining which of the potential replacements sets to select at stage 450. In some implementations, the route manager reports the expected bandwidth loss attributable to the selected one or more potential replacement sets to a network monitor.

As an illustrative example, referring to FIGS. 1 and 3C, the illustrated paths 144, 146, and 148 through the intermediary networks 130 are a multi-path set. They are represented in a multi-path forwarding table 350 as a multi-path set 362, i.e., {3, 3, 2}. Path A 144 and Path B 146 use a first edge device 124, while Path C 148 uses a second edge device 126. The two edge devices 124 and 126 might be linked to different intermediary networks 130 or may have other implementation characteristics that cause Path C 148 to operate at a lower capacity than Path A or Path B. The multi-path set {3, 3, 2} uses eight entries in the multi-path forwarding table 350. In some implementations, the method 400 can generate {1, 1} as a potential replacement set for {3, 3, 2} by dropping the third path, i.e., Path C. This potential replacement set would only use two entries in the multi-path forwarding table, resulting in 6 fewer table entries. However, removing Path C results in a loss of the network capacity contributed by Path C. In particular, Path C contributed two out of eight routing options (25%) that will not be available after removing Path C from the multi-path set. In some implementations, the multi-path set is associated with a value for an importance metric associated with the traffic transmitted over the particular multi-path set. For example, in some such implementations, the value for the importance metric is the importance score from stage 420. In some implementations, each potential replacement set is assigned an impact score equal to the value for the importance metric multiplied by the percentage of routing options removed. Continuing with the example of reducing {3, 3, 2} to {1, 1}, assuming the traffic transmitted via the multi-path set had an importance value of X, the impact score would be X times 0.25. In some implementations, this impact score is compared to scores for some (or all) other possible reductions to multi-path groups in the forwarding table, and the group replacement (or combination of group replacements) with the lowest impact score is then selected.

As an example scenario, there could be three WCMP sets represented as groups G1, G2, and G3, each carrying network flows matching one of four patterns, P1, P2, P3, and P4. The network traffic for each pattern is associated with a corresponding importance score: $C_P1$=32, $C_P2$=3, $C_P3$=3, $C_P4$=8. Flows matched by pattern P1 use the network routes of multi-path set G1, {2, 2, 2, 2, 1, 1}; flows matched by patterns P2 or P3 use the network routes of multi-path set G2, {3, 3, 2, 2}; and flows matched by pattern P4 use the network routes of multi-path set G4, {3, 3, 3, 1}. This example scenario is shown below, in Table 1. Two examples of reducing these WCMP sets (G1, G2, and G3) are shown below in Tables 2 and 3. In Table 2, the objective is to free at least five entries in a forwarding table. In Table 3, the objective is to free at least twelve entries in the forwarding table.

TABLE 1

WCMP Sets for Reduction Examples

| WCMP Set | Patterns for Associated Traffic | Number of Entries Used | Traffic Importance Score |
|---|---|---|---|
| G1: {2, 2, 2, 2, 1, 1} | P1 | 10 | 32 |
| G2: {3, 3, 2, 2} | P2 & P3 | 10 | 3 + 3 = 6 |
| G3: {3, 3, 3, 1} | P4 | 10 | 8 |

Table 2, shown below, illustrates some of the reduction options for an example wherein the objective is to free at least five entries in a forwarding table. Multi-path set G1, {2, 2, 2, 2, 1, 1} could be replaced with set {1, 1, 1, 1}, which represents a set that omits the two lowest weighted paths and treats the remaining paths as equals. The result is to free six entries from the forwarding table while losing only two of the ten routing options. The twenty percent capacity loss is weighted by the importance of the traffic (i.e., the sum of the importance scores for network flows matched by the patterns used to route traffic to the multi-path group) to generate a weighted reduction impact score of 6.4. Multi-path set G2 {3, 3, 2, 2} could be replaced with set {1, 1, 1, 1}, which represents a set that retains all of the paths, and treats them as equals. The result is to free six entries from the forwarding table while losing only twenty percent of the routing options. The twenty percent capacity loss is weighted by the importance of the traffic matching pattern P2 and the traffic matching pattern P3, to generate a weighted reduction impact score of 1.2. Multi-path set G3 {3, 3, 3, 1} could be replaced with set {1, 1, 1}, which represents a set that omits the lowest weighted path and treats the remaining paths as equals. The result is to free seven entries from the forwarding table while losing only ten percent of the routing options. The weighted reduction impact score is 0.8, which is the lowest impact score of the three options. Therefore, of the three options, the third option would be selected.

TABLE 2

WCMP Reduction Example 1

| WCMP Set | Potential Replacement Set | Number of Entries Freed | Network Capacity Lost | Traffic Importance Score | Weighted Reduction Impact Score |
|---|---|---|---|---|---|
| G1: {2, 2, 2, 2, 1, 1} | {1, 1, 1, 1} | 6 | 20% | 32 | 32 × 20% = 6.4 |
| G2: {3, 3, 2, 2} | {1, 1, 1, 1} | 6 | 20% | 6 | 6 × 20% = 1.2 |
| G3: {3, 3, 3, 1} | {1, 1, 1} | 7 | 10% | 8 | 8 × 10% = 0.8 |

Table 3, shown below, illustrates some of the reduction options for an example wherein the objective is to free at least twelve entries in a forwarding table. Multi-path set G1, {2, 2, 2, 2, 1, 1} could be replaced with set {1, 1, 1, 1}, as in example 1, or by even smaller multi-path sets {1, 1, 1}, {1, 1}, or {1}, which each represents a set that omits additional paths. None of these options, taken alone however, frees twelve entries in the forwarding table. The same holds true for the replacement options for multi-path set G2 {3, 3, 2, 2} and for multi-path set G3 {3, 3, 3, 1}. However, a combination of the two options with the lowest impact scores frees thirteen entries in the forwarding table, which achieves the objective. In some implementations, if no single option exists to reduce the number of entries used in the forwarding table by the target number, then a route manager will split the target number into two or more partial-targets that have a sum total of the original target. For example, an objective of removing twelve entries from the forwarding table can be achieved by attempting to remove six entries, and then attempting to remove another six entries. That is, the target of (12) would be split into targets of (6, 6). In some implementations, multiple possible splits are attempted, e.g., (6, 6), (7, 5), (8, 4), (4, 4, 4), (5, 4, 3), and so forth. In the example shown in Table 3, a search for a replacement set to free six entries would result in selecting {1, 1, 1} to replace G3, and another search for a replacement set to free an additional six entries would result in selecting {1, 1, 1, 1} to replace G2. This combination of replacement sets results in a reduction of thirteen entries from the forwarding table, meeting the original goal of freeing twelve entries.

multi-path set (stage 530). The route manager then removes, from the forwarding table, all of the other routing entries for the multi-path set that are not the selected entries (stage 540).

Figure 5:
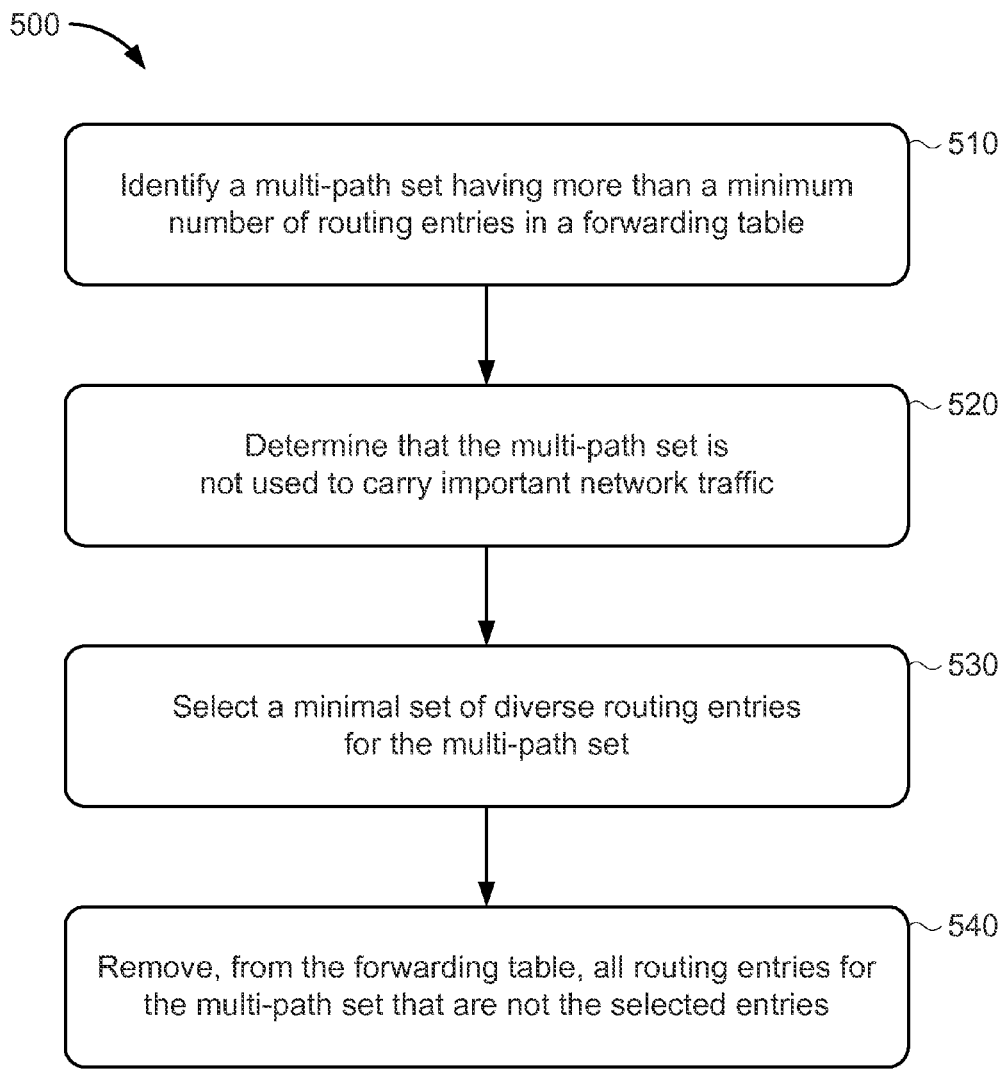
FIG. 5 is a flowchart for a method of WCMP group reduction for multi-path sets that are not used to transmit important network traffic.

Referring to FIG. 5 in more detail, the method 500 begins with a route manager identifying a multi-path set that has more than a minimum number of routing entries in the forwarding table (stage 510) and determining that the identified multi-path set is not used to carry important network traffic (stage 520). This is a special case of stages 410 and 420 shown in FIG. 4, wherein a multi-path set with more than a minimum number of (e.g., two) routing entries in the forwarding table is identified as carrying either no traffic or only low-importance traffic.

Still referring to FIG. 5 in detail, the route manager selects a minimal set of diverse routing entries for the multi-path set (stage 530). In some implementations, a minimal set is two

TABLE 3

WCMP Reduction Example 2

| WCMP Set | Potential Replacement Set | Number of Entries Freed | Network Capacity Lost | Traffic Importance Score | Weighted Reduction Impact Score |
|---|---|---|---|---|---|
| G1: {2, 2, 2, 2, 1, 1} | {1, 1, 1, 1} | 6 | 20% | 32 | 6.4 |
| G1: {2, 2, 2, 2, 1, 1} | {1, 1, 1} | 7 | 40% | 32 | 12.8 |
| G1: {2, 2, 2, 2, 1, 1} | {1, 1} | 8 | 60% | 32 | 19.2 |
| G1: {2, 2, 2, 2, 1, 1} | {1} | 9 | 80% | 32 | 25.6 |
| G2: {3, 3, 2, 2} | {1, 1, 1, 1} | 6 | 20% | 6 | 1.2 |
| G2: {3, 3, 2, 2} | {1, 1, 1} | 7 | 40% | 6 | 2.4 |
| G2: {3, 3, 2, 2} | {1, 1} | 8 | 40% | 6 | 2.4 |
| G2: {3, 3, 2, 2} | {1} | 9 | 70% | 6 | 4.2 |
| G3: {3, 3, 3, 1} | {1, 1, 1} | 7 | 10% | 8 | 0.8 |
| G3: {3, 3, 3, 1} | {1, 1} | 8 | 40% | 8 | 3.2 |
| G3: {3, 3, 3, 1} | {1} | 9 | 70% | 8 | 5.6 |

In some implementations, an exhaustive comparison is performed across all possible replacement sets, or all possible replacement sets within a set of constraint parameters. In some implementations, the exhaustive comparison is limited to a sub-set of possible replacement sets generated as candidate replacement sets. For example, in some implementations, options for multi-path replacement sets are only generated for WCMP sets used to carry traffic with an importance score below a threshold. In some such implementations, the threshold is incrementally increased until a viable option is identified. In some implementations, the exhaustive comparison includes comparing potential combinations of replacement sets. For example, a combination of replacement sets was used in the example illustrated by Table 3.

Referring to FIG. 4, The route manager then replaces, in the forwarding table, the routing entries for one or more multi-path sets with routing entries for corresponding selected replacement sets (460). In some implementations, the route manager generates a new forwarding table with the selected replacement multi-path sets, and omits the corresponding replaced sets.

FIG. 5 is a flowchart for a method 500 of WCMP group reduction for multi-path sets that are not used to transmit important network traffic. Similar to the method 400, the method 500 begins with a route manager identifying a multi-path set that has more than a minimum number of routing entries in the forwarding table (stage 510). The route manager determines that the identified multi-path set is not used to carry important network traffic (stage 520) and selects a minimal set of diverse routing entries for the routes. In some implementations, a larger minimal set is used. The route manager selects routing entries corresponding to non-identical paths such that the resulting replacement multi-path set has path diversity. In some implementations, the route manager selects the highest weighted non-identical paths for inclusion in the minimal set. In some implementations, the route manager calculates the potential bandwidth loss that would result from removing or replacing the various routing entries, and selects routing entries associated with an acceptable level of bandwidth reduction. In some such implementations, the selection minimizes the loss of bandwidth. In some implementations, the route manager reports the expected bandwidth loss attributable to the selected one or more potential replacement sets to a network monitor. In some implementations, the route manager selects the non-identical paths at random, or according to another selection criteria. In some implementations, the selection at stage 530 is similar to the selection described in reference to stage 450 for the method shown in FIG. 4.

Referring still to FIG. 5, the route manager then updates the forwarding table to replace the multi-path route set with the selected minimal set of diverse routes (stage 540). The route manager removes, from the forwarding table, all of the other routing entries for the multi-path set that are not the selected entries.

Figure 6:
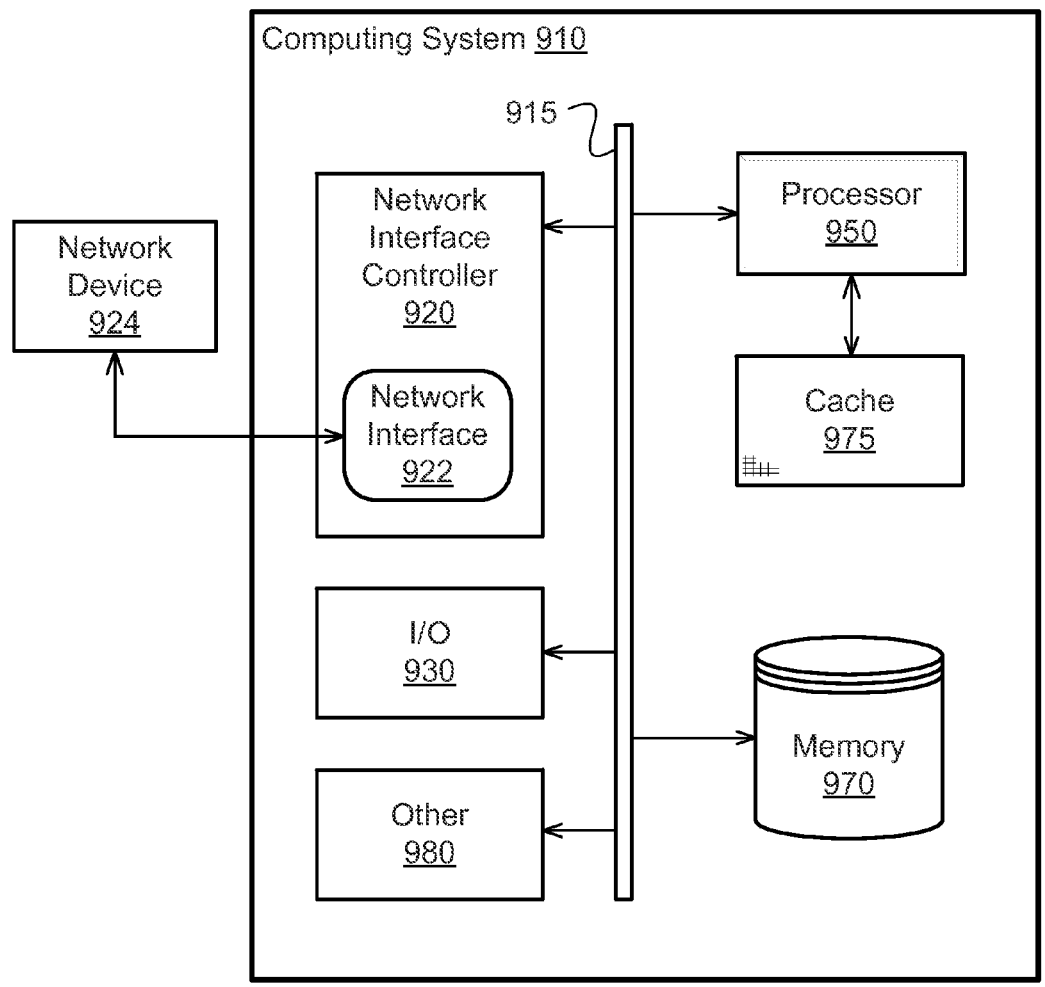
FIG. 6 is a block diagram of a computing system in accordance with an illustrative implementation.

FIG. 6 is a block diagram of a computing system 910 suitable for use in implementing the computerized components described herein. In broad overview, the computing system 910 includes at least one processor 950 for performing actions in accordance with instructions, and one or more memory devices 970 and/or 975 for storing instructions and data. The illustrated example computing system 910 includes one or more processors 950 in communication, via a bus 915, with memory 970 and with at least one network interface controller 920 with a network interface 922 for connecting to external network devices 924, e.g., participating in a network (such as the networks 110, 130, and 150 shown in FIG. 1). The one or more processors 950 are also in communication, via the bus 915, with any I/O devices at one or more I/O interfaces 930, and any other devices 980. The processor 950 illustrated incorporates, or is directly connected to, cache memory 975. Generally, a processor will execute instructions received from memory.

In more detail, the processor 950 may be any logic circuitry that processes instructions, e.g., instructions fetched from the memory 970 or cache 975. In many embodiments, the processor 950 is a microprocessor unit or special purpose processor. The computing device 910 may be based on any processor, or set of processors, capable of operating as described herein. The processor 950 may be a single core or multi-core processor. The processor 950 may be multiple processors.

The memory 970 may be any device suitable for storing computer readable data. The memory 970 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-Ray® discs). A computing system 910 may have any number of memory devices 970.

The cache memory 975 is generally a form of computer memory placed in close proximity to the processor 950 for fast read times. In some implementations, the cache memory 975 is part of, or on the same chip as, the processor 950. In some implementations, there are multiple levels of cache 975, e.g., L2 and L3 cache layers.

The network interface controller 920 manages data exchanges via the network interface 922. The network interface controller 920 handles the physical and data link layers of the OSI model for network communication. In some implementations, some of the network interface controller's tasks are handled by the processor 950. In some implementations, the network interface controller 920 is part of the processor 950. In some implementations, a computing system 910 has multiple network interface controllers 920. In some implementations, the network interface 922 is a connection point for a physical network link, e.g., an RJ 45 connector. In some implementations, the network interface controller 920 supports wireless network connections and an interface port 922 is a wireless receiver/transmitter. Generally, a computing device 910 exchanges data with other computing devices 924 via physical or wireless links to a network interface 922. In some implementations, the network interface controller 920 implements a network protocol such as Ethernet.

The other computing devices 924 are connected to the computing device 910 via a network interface port 922. The other computing device 924 may be a peer computing device, a network device, or any other computing device with network functionality. For example, a computing device 924 may be a network device such as a hub, a bridge, a switch, or a router, connecting the computing device 910 to a data network such as the Internet.

In some uses, the I/O interface 930 supports an input device and/or an output device (not shown). In some uses, the input device and the output device are integrated into the same hardware, e.g., as in a touch screen. In some uses, such as in a server context, there is no I/O interface 930 or the I/O interface 930 is not used. In some uses, additional other components 980 are in communication with the computer system 910, e.g., external devices connected via a universal serial bus (USB).

The other devices 980 may include an I/O interface 930, external serial device ports, and any additional co-processors. For example, a computing system 910 may include an interface (e.g., a universal serial bus (USB) interface) for connecting input devices (e.g., a keyboard, microphone, mouse, or other pointing device), output devices (e.g., video display, speaker, refreshable Braille terminal, or printer), or additional memory devices (e.g., portable flash drive or external media drive). In some implementations an I/O device is incorporated into the computing system 910, e.g., a touch screen on a tablet device. In some implementations, a computing device 910 includes an additional device 980 such as a co-processor, e.g., a math co-processor that can assist the processor 950 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method of generating a forwarding table for a packet switch, the method comprising:
   identifying, in a forwarding table of a packet switch, a plurality of multi-path groups wherein each multi-path group corresponds to a respective initial set of a plurality of forwarding entries in the forwarding table and each forwarding entry identifies an egress port of the packet switch and wherein the identified multi-path groups have a number of forwarding entries that exceed a predetermined number of entries,
   generating, for one or more multi-path groups in the plurality of multi-path groups, at least one replacement set of forwarding entries with fewer forwarding entries than the initial set of forwarding entries corresponding to the respective multi-path group;
   selecting, based on a traffic reduction cost metric, one or more of the replacement sets of forwarding entries, each selected replacement set corresponding to a different respective multi-path group in the plurality of multi-path groups; and
   replacing, in the forwarding table of the packet switch, the initial set of forwarding entries for each multi-path group corresponding to a selected replacement set of forwarding entries, with the respective corresponding selected replacement set of forwarding entries.

2. The method of claim 1,
   wherein the traffic reduction cost metric includes a first traffic characteristic; and
   wherein selecting, based on the traffic reduction cost metric, a replacement set of forwarding entries corresponding to a multi-path group having the first traffic characteristic comprises selecting a replacement set of forwarding entries with less than a maximum number of forwarding entries, each forwarding entry in the replacement set corresponding to a different network path.

3. The method of claim 2, wherein the replacement set of forwarding entries with less than the maximum number of forwarding entries has exactly two forwarding entries.

4. The method of claim 2, wherein the multi-path group having the first network traffic characteristic does not transmit, to the multi-path group, network packets that are one or more of: network packets using a stateful transport-layer protocol, network packets for a flow exceeding a sizing limitation, and network packets addressed to a particular network address range.

5. The method of claim 1, further comprising
   comparing a first traffic reduction cost metric value for a first generated replacement set of forwarding entries corresponding to a first multi-path group with a second traffic reduction cost metric value for a second generated replacement set of forwarding entries corresponding to the first multi-path group; and
   selecting the first generated replacement set of forwarding entries based on the comparing.

6. The method of claim 1, further comprising
   comparing a first traffic reduction cost metric value for a first generated replacement set of forwarding entries corresponding to a first multi-path group with a second traffic reduction cost metric value for a second generated replacement set of forwarding entries corresponding to a second multi-path group; and
   selecting the first generated replacement set of forwarding entries based on the comparing.

7. The method of claim 1, further comprising
   comparing a first traffic reduction cost metric value for a first plurality of generated replacement sets of forwarding entries respectively corresponding to a first plurality of multi-path groups with a second traffic reduction cost metric value for a second plurality of generated replacement sets of forwarding entries respectively corresponding to a second plurality of multi-path groups; and
   selecting the first plurality of generated replacement sets of forwarding entries based on the comparing.

8. The method of claim 1, wherein replacing the initial set of forwarding entries with the replacement set of forwarding entries reduces the number of forwarding entries in the forwarding table by at least a predetermined amount.

9. The method of claim 1, wherein the traffic reduction cost metric includes a network bandwidth metric weighted by a score corresponding to traffic traversing the multi-path group.

10. The method of claim 1, wherein the packet switch is part of a software-defined network (SDN) and wherein replacing, in the forwarding table of the packet switch, the initial set of forwarding entries with the replacement set of forwarding entries comprises transmitting instructions from an SDN controller to the packet switch.

11. A system comprising:
    a packet switch with a forwarding table; and
    a route manager for the packet switch, the route manager configured to:
      identify, in the forwarding table, a plurality of multi-path groups, wherein each multi-path group corresponds to a respective initial set of a plurality of forwarding entries in the forwarding table and each forwarding entry identifies an egress port of the packet switch and wherein the identified multi-path groups have a number of forwarding entries that exceed a predetermined number of entries;
      generate, for one or more multi-path groups in the plurality of multi-path groups, at least one replacement set of forwarding entries with fewer forwarding entries than the initial set of forwarding entries corresponding to the respective multi-path group;
      select, based on a traffic reduction cost metric, one or more of the replacement sets of forwarding entries, each selected replacement set corresponding to a different respective multi-path group in the plurality of multi-path groups; and
      replace, in the forwarding table, the initial set of forwarding entries for each multi-path group corresponding to a selected replacement set of forwarding entries, with the respective corresponding selected replacement set of forwarding entries.

12. The system of claim 11,
wherein the traffic reduction cost metric includes a first traffic characteristic; and
wherein the route manager is configured to select, based on the traffic reduction cost metric, a replacement set of forwarding entries corresponding to a multi-path group having the first traffic characteristic by selecting a replacement set of forwarding entries with less than a maximum number of forwarding entries, each forwarding entry in the replacement set corresponding to a different network path.

13. The system of claim 12, the replacement set of forwarding entries with less than the maximum number of forwarding entries having exactly two forwarding entries.

14. The system of claim 12, wherein the multi-path group having the first network traffic characteristic does not transmit, to the multi-path group, network packets that are one or more of: network packets using a stateful transport-layer protocol, network packets for a flow exceeding a sizing limitation, and network packets addressed to a particular network address range.

15. The system of claim 11, the route manager further configured to:
compare a first traffic reduction cost metric value for a first generated replacement set of forwarding entries corresponding to a first multi-path group with a second traffic reduction cost metric value for a second generated replacement set of forwarding entries corresponding to the first multi-path group; and
select the first generated replacement set of forwarding entries based on the comparing.

16. The system of claim 11, the route manager further configured to:
compare a first traffic reduction cost metric value for a first generated replacement set of forwarding entries corresponding to a first multi-path group with a second traffic reduction cost metric value for a second generated replacement set of forwarding entries corresponding to a second multi-path group; and
select the first generated replacement set of forwarding entries based on the comparing.

17. The system of claim 11, the route manager further configured to:
compare a first traffic reduction cost metric value for a first plurality of generated replacement sets of forwarding entries respectively corresponding to a first plurality of multi-path groups with a second traffic reduction cost metric value for a second plurality of generated replacement sets of forwarding entries respectively corresponding to a second plurality of multi-path groups; and
select the first plurality of generated replacement sets of forwarding entries based on the comparing.

18. The system of claim 11, wherein the route manager is configured to replace the initial set of forwarding entries with the replacement set of forwarding entries to reduce the number of forwarding entries in the forwarding table by at least a predetermined amount.

19. The system of claim 11, wherein the traffic reduction cost metric includes a network bandwidth metric weighted by a score corresponding to traffic traversing the multi-path group.

20. The system of claim 11, wherein the packet switch is part of a software-defined network (SDN) and wherein the route manager is part of an SDN controller, the SDN controller configured to replace, in the forwarding table of the packet switch, the initial set of forwarding entries with the replacement set of forwarding entries by transmitting instructions to the packet switch.

* * * * *